(12) United States Patent
Batabyal et al.

(10) Patent No.: US 8,214,499 B2
(45) Date of Patent: Jul. 3, 2012

(54) SYSTEM AND METHOD FOR ENABLING SOFTWARE APPLICATIONS AS A SERVICE IN A NON-INTRUSIVE MANNER

(75) Inventors: Ritwik Batabyal, Bangalore (IN); Hemanth Kumar Aswathanarayana, Bangalore (IN)

(73) Assignee: Wipro Limited, Bangalore, Karnataka (IN)

( * ) Notice: Subject to any disclaimer, the term of this patent is extended or adjusted under 35 U.S.C. 154(b) by 126 days.

(21) Appl. No.: 12/605,390

(22) Filed: Oct. 26, 2009

(65) Prior Publication Data

US 2011/0099276 A1   Apr. 28, 2011

(51) Int. Cl.
    *G06F 15/173* (2006.01)
    *G06F 15/16* (2006.01)
(52) U.S. Cl. ............... 709/226; 709/229; 707/999.01
(58) Field of Classification Search .......... 463/42; 709/217–219, 226, 227, 229, 230, 250; 707/999.01
    See application file for complete search history.

(56) References Cited

U.S. PATENT DOCUMENTS

2010/0093441 A1* 4/2010 Rajaraman et al. ............ 463/42
* cited by examiner

*Primary Examiner* — Peling Shaw
(74) *Attorney, Agent, or Firm* — Prakash Nama; Global IP Services, PLLC (57) ABSTRACT

A system and method for enabling software applications as a service in a non-intrusive manner in isolated user groups (IUGs) is disclosed. In one embodiment, a method includes receiving a user request from one of the plurality of IUGs to access application functionality of one of plurality of software applications, identifying the one of the plurality of IUGs, locating one of the plurality of service modules by a service gateway based on a request sent by one of the plurality of service adapters, providing an appropriate access to the one of the plurality of IUGs, obtaining configuration data associated with the one of the plurality of IUGs, forwarding the configuration data and the user request to the one of the plurality of software applications, and generating an appropriate response associated with the application functionality and returning the generated appropriate response to the one of the plurality of IUGs.

16 Claims, 6 Drawing Sheets

SYSTEM AND METHOD FOR ENABLING SOFTWARE APPLICATIONS AS A SERVICE IN A NON-INTRUSIVE MANNER

FIELD OF TECHNOLOGY

Embodiments of the present invention relate to the field of computer software. More particularly, embodiments of the present invention relate to enabling software applications as a service.

BACKGROUND

Typically, in a software deployment model, a software application vendor or developer may license a software application to multiple isolated user groups (IUGs). Users may then subscribe to respective services provided by the multiple IUGs. According to the software deployment model, the software application vendor may host the software application on its own server so that the users' consumer devices subscribing to the services may access application functionality of the software application via a web interface.

In order to enable the software application as a service to the multiple IUGs, service enablement features may need to be built into the software application, thus prompting extensive modification on source code of the software application. Alternatively, the software application vendor may configure the software application to operate on a third-party server. However, this may also call for an extensive revision in the source code of the software application, especially when the software application and the third party server are coded using two different programming languages.

SUMMARY

A system and method for enabling software applications as a service in a non-intrusive manner is disclosed. According to one aspect of the present invention, a service enablement platform (SEP) system for enabling a plurality of software applications as a service in a non-intrusive manner in a plurality of IUGs includes a plurality of service adapters, a plurality of service modules and a service gateway. An associated one of the plurality of service adapters receives a user request from one of the plurality of IUGs to access application functionality of one of the plurality of software applications in the non-intrusive manner.

Then, the service gateway locates one of the plurality of service modules based on a request sent by the associated one of the plurality of service adapters. The associated one of the plurality of service adapters identifies the one of the plurality of IUGs based on the received user request. The located one of the plurality of service modules provides appropriate access to the one of the plurality of IUGs for the requested application functionality via the service gateway. The associated one of the plurality of service adapters obtains configuration data associated with the one of the plurality of IUGs and forwards the configuration data and the user request to the one of the plurality of software applications.

The one of the plurality of software applications generates an appropriate response to provide access to the application functionality based on the user request and the configuration data and returns the generated appropriate response to the one of the plurality of IUGs via the associated one of the plurality of service adapters. Further, the SEP system includes a configuration module where the configuration module associates each of the plurality of service adapters to one of the plurality of software applications for intercepting the user request.

The configuration module further associates each of the plurality of service adapters to the service gateway for attaching the one of the plurality of software applications to the service gateway. The configuration module configures each of the plurality of service modules for performing different service enablement features. The configuration module furthermore associates the service gateway to the plurality of service modules for fulfilling the different service enablement features.

According to another aspect of the present invention, a method for enabling a plurality of software applications as a service in a non-intrusive manner in a plurality of IUGs includes receiving a user request from one of the plurality of IUGs to access application functionality of one of the plurality of software applications in the non-intrusive manner by an associated one of the plurality of service adapters. The method also includes locating one of the plurality of service modules by a service gateway based on a request sent by the one of the plurality of service adapters and identifying the one of the plurality of IUGs based on the received user request by the one of the plurality of service adapters.

The method further includes providing an appropriate access to the one of the plurality of IUGs for the requested application functionality using the one of the plurality of service modules via the service gateway. Then, the method includes obtaining configuration data associated with the one of the plurality of IUGs of the one of the plurality of software applications by the located one of the plurality of service adapters.

In addition, the method includes forwarding the configuration data and the user request to the one of the plurality of software applications using the associated one of the plurality of service adapters. Moreover, the method includes generating an appropriate response to provide access to the application functionality by the one of the plurality of software applications based on the user request and the configuration data and returning the generated appropriate response to the one of the plurality of IUGs via the associated one of the plurality of service adapters.

According to yet another aspect of the present invention, a computer readable medium having instructions that, when executed by a computer, cause the computer to perform a method of enabling a plurality of software applications as a service in a non-intrusive manner in a plurality of IUGs as described above.

The methods, systems, and apparatuses disclosed herein may be implemented in any means for achieving various aspects, and other features will be apparent from the accompanying drawings and from the detailed description that follow.

BRIEF DESCRIPTION OF THE DRAWINGS

Various preferred embodiments are described herein with reference to the drawings, wherein.

The drawings described herein are for illustration purposes only and are not intended to limit the scope of the present disclosure in any way.

DETAILED DESCRIPTION

A system and method for enabling software applications as a service in a non-intrusive manner is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

In the document, the term "non-intrusive manner" refers to not requiring any modification to a core software application for associating with a service enablement platform (SEP) to offer as a service.

Figure 1:
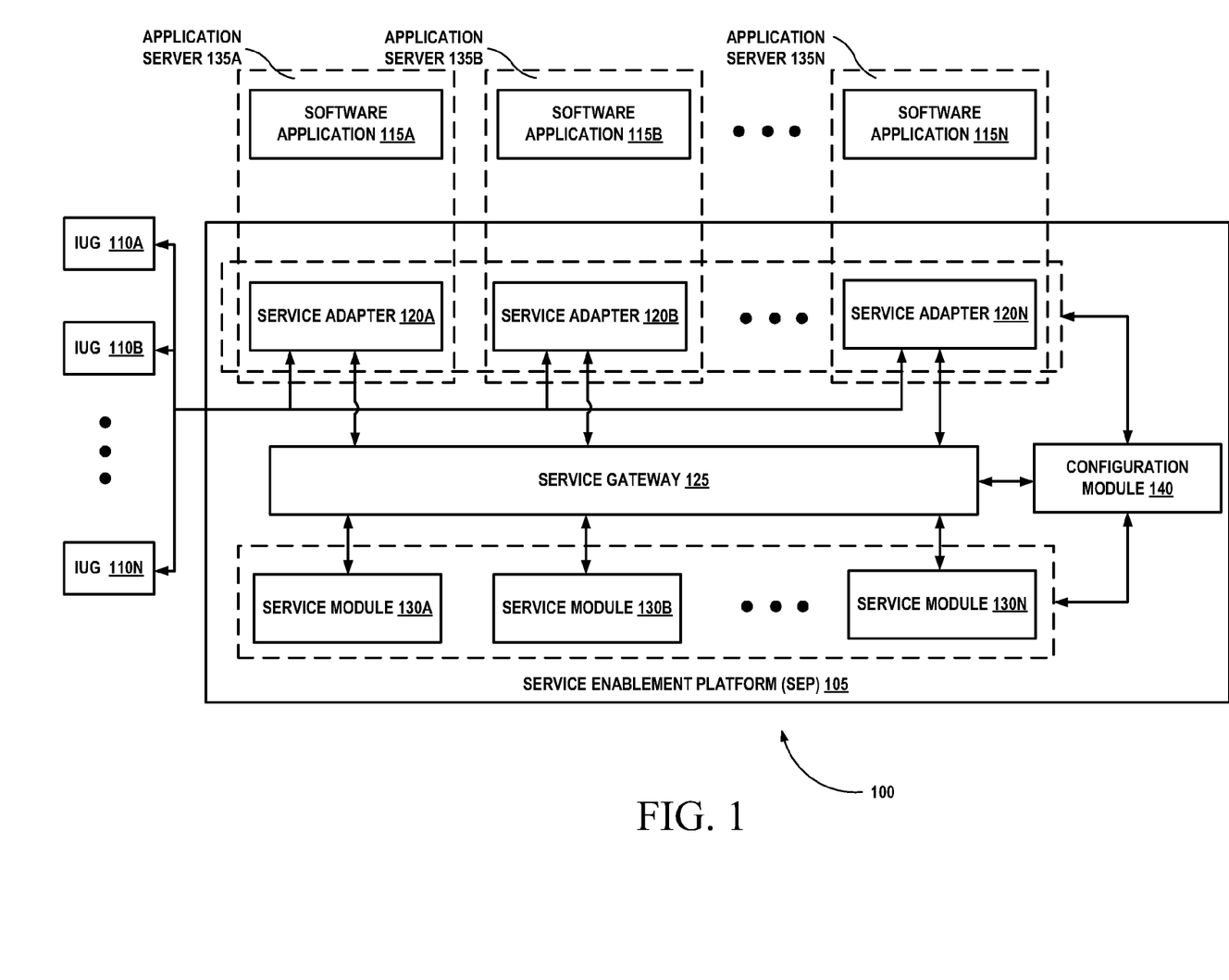
FIG. 1 illustrates a service enablement platform (SEP) system which enables software applications as a service in a non-intrusive manner in a multiple isolated user groups (IUGs), according to one embodiment.

FIG. 1 illustrates a service enablement platform (SEP) system 100 which enables software applications 115A-N as a service in a non-intrusive manner in isolated user groups (IUGs) 110A-N, according to one embodiment. In FIG. 1, the SEP system 100 includes an SEP 105, the IUGs 110A-N and the software applications 115A-N. The SEP 105 includes service adapters 120A-N, a service gateway 125, service modules 130A-N and a configuration module 140.

The service adapters 120A-N may include modules which intercept user requests from the IUGs 110A-N and connect to the service gateway 125 for invoking requests for different service enablement feature based on the user requests for application functionalities. The service gateway 125 may be an open architecture for invoking application functionality associated with the software applications 115A-N in a loosely coupled manner. The service modules 130A-N may include an adaptation service module, an infrastructure service module, a business service module, a presentation service module, a monitoring service module and the like for performing one or more services to fulfill service enablement features associated with the software applications 115A-N. The service modules 130A-N may provide different service enablement features such as IUG management, usage management, usage billing, security management, user session management and the like, to the IUGs 110A-N.

The configuration module 140 may be operable for configuring each of the service adapters 120A-N, the service gateway 125 and each of the service modules 130A-N. As illustrated, the service gateway 125 is coupled between the service adapters 120A-N and the service modules 130A-N. Further, the configuration module 140 is coupled to each of the service adapters 120A-N, the service gateway 125 and each of the service modules 130A-N.

The IUGs 110A-N may be a group of users belonging to an organization that subscribes to the software applications 115A-N offered as a service. The software applications 115A-N may be applications built using different technologies that are enabled using the SEP 105 to offer as a service to the IUGs 110A-N.

As illustrated in FIG. 1, each one of the service adapters 120A-N are associated with one of the software applications 115A-N. In one example embodiment, each of the software applications 115A-N and associated one of the service adapters 120A-N may reside in different application servers 135A-N. For example, as illustrated in FIG. 1, the application server 135A includes the software application 115A and the service adapter 120A, the application server 135B includes the software application 115B and the service adapter 115B and the application server 135N includes the software application 115N and the service adapter 115N. In another example embodiment, the software applications 115A-N with associated ones of the service adapters 120A-N may reside in a single application server.

Consider that, a user of the IUG 110A wishes to access application functionality of the software application 115A. In an exemplary operation, the user of the IUG 110A sends a user request to the SEP 105 for accessing the application functionality of the software application 115A. The service adapter 120A associated with the software application 115A intercepts the user request from the IUG 110A. In one example embodiment, the configuration module 140 associates the service adapter 120A to the software application 115A for intercepting the user request. In this example embodiment, the configuration module 140 associates the service adapter 120A to the service gateway 125 for attaching the software application 115A to the service gateway 125. The service adapter 120A, which is associated with the software application 115A, then sends a request to the service gateway 125 for identifying an IUG associated with the received user request. The service gateway 125 locates one of the service modules 130A-N based on the request from the service adapter 120A.

The located one of the service modules 130A-N identifies an IUG based on specific parameters in the received user request. For example, if the user request is in the form of a URL, the service adapter 120A identifies the IUG based on a domain name in the URL or a token value specific to the IUG in the URL. In one embodiment, the located one of the service modules 130A-N determines whether the received user request is associated with an IUG identifier (ID). In one example embodiment, if the user request is not associated with the IUG ID, then the located one of the service modules 130A-N denies access to the application functionality by returning a response to the service adapter 120A via a service gateway 125. For example, the response may include an appropriate error code indicating that the access to the application functionality requested by the IUG 110A is denied.

In another example embodiment, if the user request is associated with the IUG ID, then the located one of the service modules 130A-N determines the application functionality requested by the identified IUG (e.g., in this case, the identified IUG is the IUG 110A). Further, the located one of the service modules 130A-N compares the requested application functionality with an access control list configured for the IUG 110A. For example, the access control list may be a list that defines privileges granted to the IUG 110A to access the requested application functionality. Accordingly, the located one of the service modules 130A-N may authorize the IUG 110A to access the requested application functionality.

Also, the located one of the service modules 130A-N returns the IUG ID associated with the IUG 110A to the service adapter 120A via the service gateway 125 to provide an appropriate access to the requested application functionality. The service adapter 120A then initiates a request for specific configuration data associated with the IUG 110A to the service gateway 125. The service gateway 125 checks whether a cached copy of the requested configuration data associated with the IUG 110A is available in memory (not shown in FIG. 1) of the service gateway 125. In one embodiment, if the cached copy of the requested configuration data is available, then the service gateway 125 may provide the configuration data associated with the IUG 110A to the service adapter 120A.

In an alternate embodiment, if the cached copy of the requested specific configuration data is unavailable, then the service gateway 125 requests the located one of the service modules 130A-N for the specific configuration data associated with the IUG 110A. In such a case, the located one of the service modules 130A-N loads the configuration data associated with the IUG 110A from a storage device (e.g., non-volatile memory) associated with the located one of the service modules 130A-N. Accordingly, the loaded configuration data associated with the IUG 110A is cached in the memory associated with the service gateway 125. Also, the loaded configuration data associated with the IUG 110A is returned to the service adapter 120A.

The service adapter 120A forwards the configuration data and the user request associated with the IUG 110A to the associated software application 115A. Accordingly, the software application 115A generates an appropriate response for providing access to the requested application functionality based on the user request and the configuration data. Finally, the software application 115A returns the appropriate response to the IUG 110A via the service adapter 120A. For example, the appropriate response may be a webpage associated with the software application 115A in a hyper text markup language (HTML) format. Further, the webpage may be displayed on a display device of a computer associated with the user of the IUG 110A.

Suppose, if a user associated with the IUG 110B wishes to access application functionality associated with the software application 115A. In such a scenario, the SEP 105 may provide an appropriate response associated with the application functionality by executing the same instance of the software application 115A in the non-intrusive manner based on specific configuration data associated with the IUG 110B. It can be noted that, the configuration data associated with each of the IUGs 110A-N differentiates the software application 115A from behaving from one IUG to other IUG. Thus, in the manner described above, the SEP system 100 enables the software applications 115A-N as a service in the non-intrusive manner for the IUGs 110A-N based on the configuration data associated with the respective IUGs 110A-N.

Figure 4:
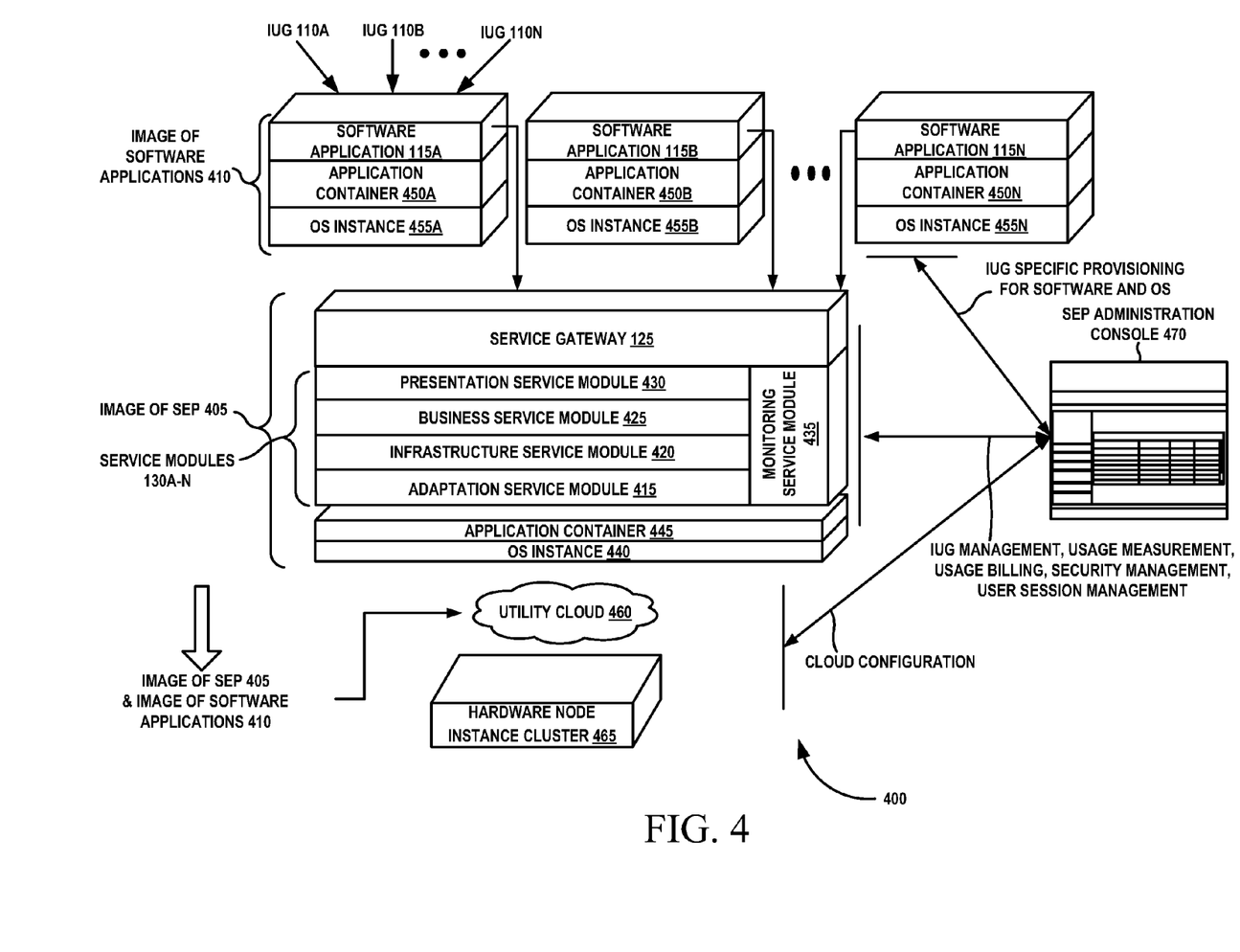
FIG. 4 illustrates an exemplary implementation of the SEP system in a virtual environment, according to one embodiment.

In one exemplary implementation, the software applications 115A-N, the associated service adapters 120A-N, the service gateway 125 and the service modules 130A-N may execute within virtual machines running on a utility cloud, as will be illustrated in FIG. 4. It is appreciated that, in one exemplary implementation, the SEP system 100 can be implemented in a software as a service (SAAS) environment for enabling the software applications 115A-N as a service.

In the accordance with the foregoing description, the service adapters 120A-N may include aspect code implemented using Aspect Oriented Programming (AOP) code which enables the SEP system 100 to offer the software applications 115A-N as a service to the IUGs 110A-N in the non-intrusive manner. The AOP code may be based on a programming language (e.g., JAVA™, C#™, PHYTHON®, and the like) used for building the software applications 115A-N.

According to an embodiment of the present invention, the aspect code facilitates the SEP 105 to provide appropriate access to application functionality of a software application (e.g., the software application 115A) in a non-intrusive manner as described below. For example, the software application 115A is analyzed to identify areas of the software application 115A to be enabled. Based on the analysis, specific configuration data associated with each of the IUGs 110A-N is defined and modeled. Also, areas in the software application 115A, where behavioral differences between the IUGs 110A-N that have to be introduced, are identified.

Further, cross-cuts are identified within the software application 115A where the specific configuration data associated with the IUGs 110A-N can be injected during execution of the software application 115A. Based on the identified cross-cuts in the software application 115A, the aspect code is implemented and the configuration data associated with each of the IUGs 110A-N is configured and stored in the SEP 105.

During runtime, when a particular IUG request for accessing application functionality associated with the software application 115A, specific configuration data associated with that IUG is retrieved by the service gateway 125 and is returned to the aspect code in the service adapter 120A. The software application 115A is executed using the configuration data as described above. In one example embodiment, the enabling of the software applications 115A in the non-intrusive manner helps introduce IUG specific customization at various tiers of the software application 115A (e.g., from a user interface level to a database access level).

Also, the enabling of the software application as a service in the non-intrusive manner facilitates adding of additional traits to the software application 115A without the need to modify source code of the software application 115A. The aspect code in the service adapters 120A-N also facilitate the SEP 105 to provide different service enablement features such as IUG management, usage management, usage billing, security management and user session management as will be described in greater detail in description of FIG. 2.

Figure 2:
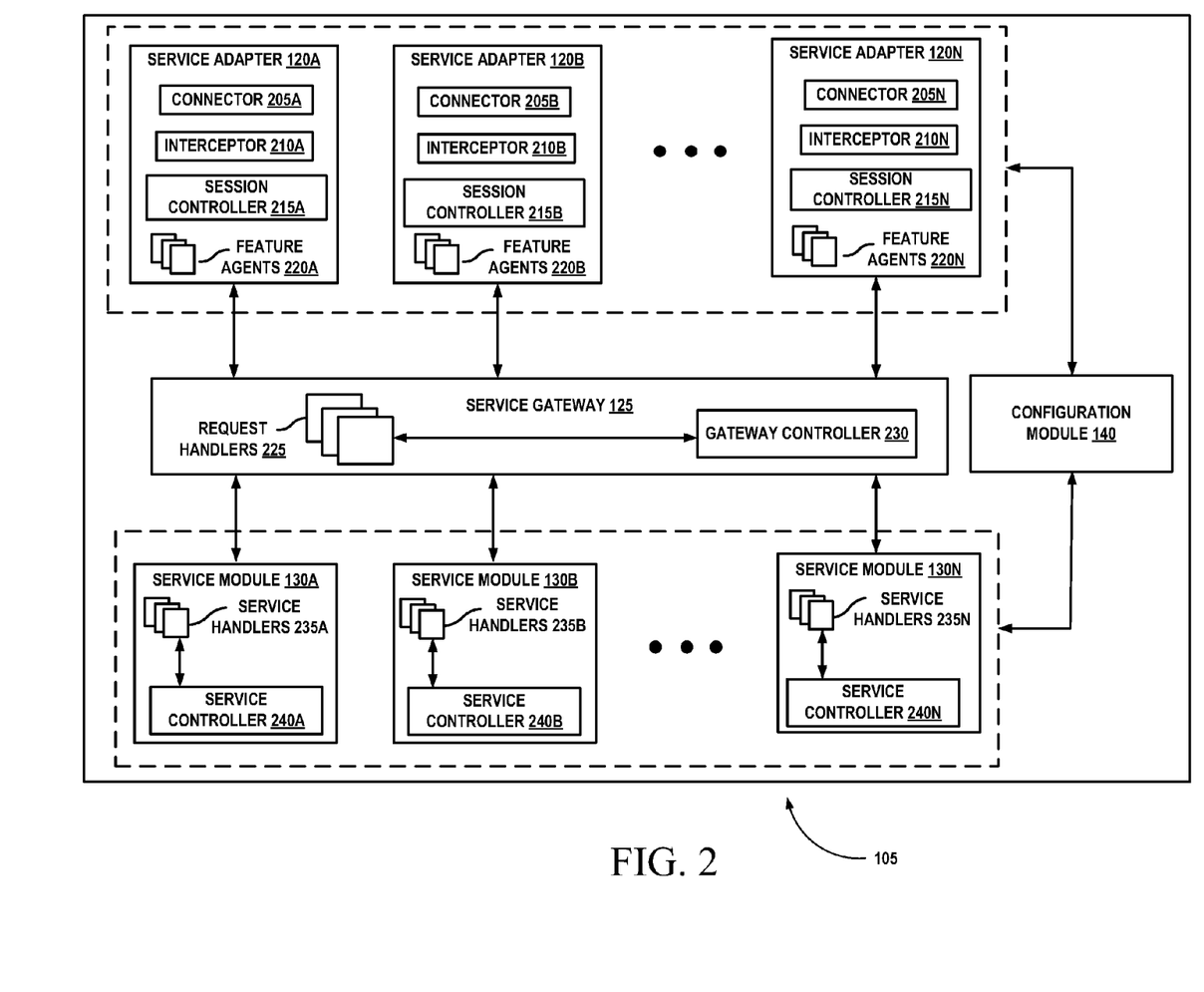
FIG. 2 illustrates an exploded view of an SEP of the SEP system such as those shown in FIG. 1, according to one embodiment.

FIG. 2 illustrates an exploded view of the SEP 105 of the SEP system 100 such as those shown in FIG. 1, according to one embodiment. As shown in FIG. 2, the services adapters 120A-N include connectors 205A-N, interceptors 210A-N, session controllers 215A-N and feature agents 220A-N. The connectors 205A-N are configured for attaching the software applications 115A-N associated with the service adapters 120A-N with the service gateway 125. The interceptors 210A-N are configured for intercepting the user request received from the IUGs 110A-N to the software applications 115A-N associated with the service adapters 120A-N.

The session controllers 215A-N are configured for controlling IUG user sessions in collaboration with the service gateway 125. The feature agents 220A-N are configured for invoking requests for the service enablement features on the service gateway 125 corresponding to the user request. Also, as illustrated, the service gateway 125 includes request handlers 225 and a gateway controller 230. The request handlers 225 are configured for invoking the service modules 130A-N for servicing the request for the service enablement features from one of the service adapters 120A-N.

The gateway controller 230 is configured for managing the request handlers 225. Thus, the gateway controller 230 manages a concurrency control with respect to the software applications 115A-N across the IUGs 110A-N. The gateway controller 230 is also configured for delegating the request for the service enablement features received from the one of the service adapters 120A-N to an associated one of the request handlers 225.

As illustrated, the service modules 130A-N include service handlers 235A-N and service controllers 240A-N. The service handlers 235A-N are configured for fulfilling the service enablement features received from the one of the service adapters 120A-N. The service controllers 240A-N are configured for managing the service handlers 235A-N. In one example embodiment, the configuration module 140 configures each of the service modules 130A-N for performing the different service enablement features. Further, the configuration module 140 associates the service gateway 125 to the service modules 130A-N for fulfilling the different service enablement features.

Figure 3:
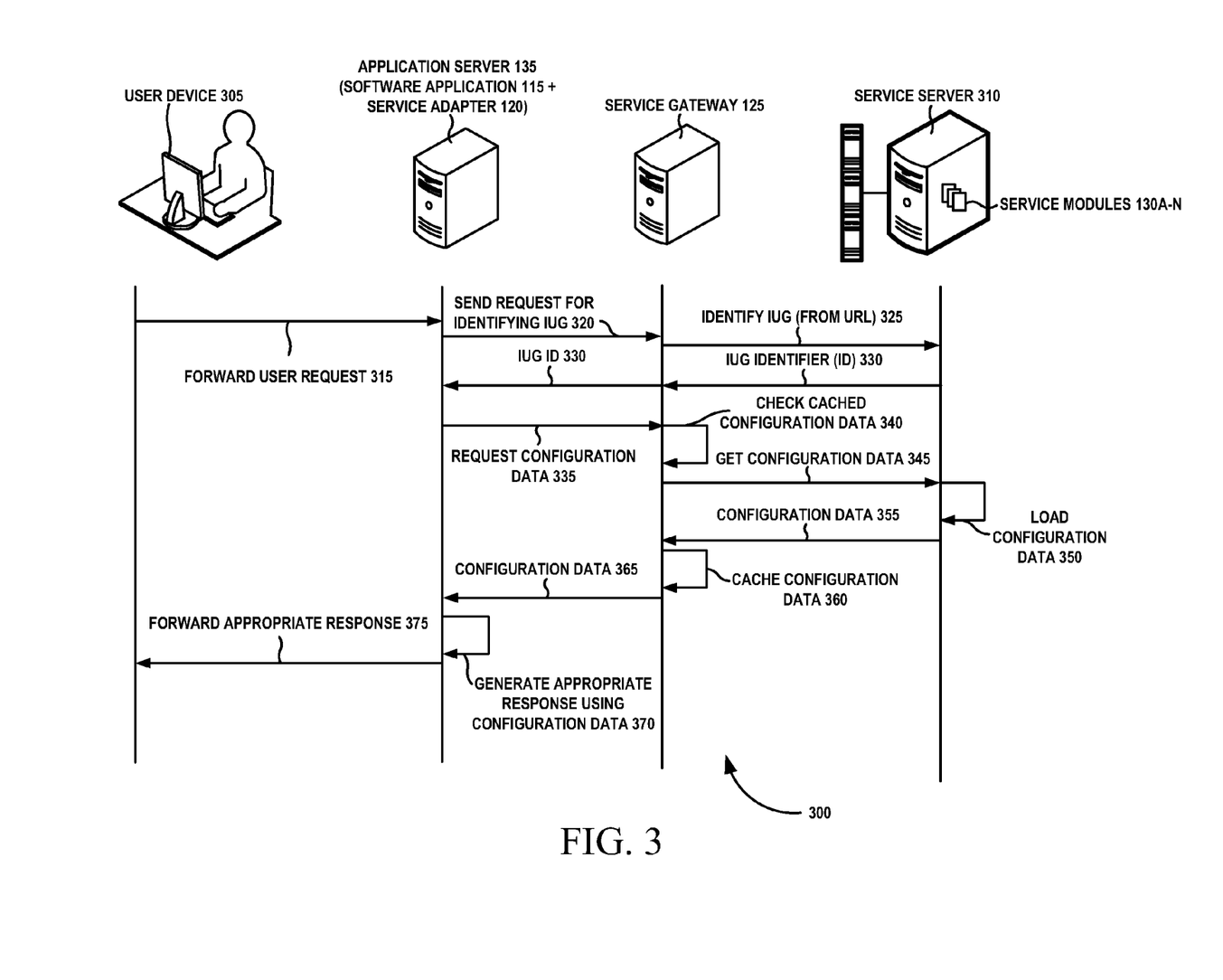
FIG. 3 is a process diagram of the SEP system for enabling a software application as a service in a non-intrusive manner, according to one embodiment.

FIG. 3 is a process diagram 300 of the SEP system 100 for enabling the software application 115 as a service in a non-intrusive manner, according to one embodiment. The SEP system 100 includes a user device 305, the application server 135, the service gateway 125 and a service server 310 having the service modules 130A-N. The user device 305 may be a computer of a user belonging to one of the IUGs 110A-N. The application server 135 may include the software application 115 and the associated service adapter 120. It is appreciated that, the service gateway 125, the application server 135 and/or the service server 310 may be realized through software and/or hardware In the exemplary operation, when the user of the user device 112, subscribing to the software application 115, wish to access application functionality associated with the software application 115, the SEP system 100 performs steps 315-365 as described below. At step 315, the user sends a user request for accessing the application functionality of the software application 115 from the user device 305 to the application server 135.

In one example embodiment, the user request may be associated with a webpage associated with the software application 115 in hypertext transfer protocol (HTTP) format. In this example embodiment, the application server 135 may receive the user request from the user device 305 via a web server (not shown). In step 320, the service adapter 120 in the application server 135 intercepts the user request and sends a request for identification of the one of the IUGs 110A-N associated with the user request to the service gateway 125. At step 325, the service gateway 125 locates appropriate one of the service modules 130A-N in the service server 310 based on the request for identification.

Further, at step 325, the service gateway 125 requests the appropriate one of the service modules 130A-N to identify the one of the IUGs 110A-N associated with the user request. Also, at step 325, the appropriate one of the service modules 130A-N identifies the one of the IUGs 110A-N based on specific parameters (e.g., URL) in the received user request. Upon identifying the one of the IUGs 110A-N, the appropriate one of the service modules 130A-N retrieves and sends an IUG identifier (ID) associated with the one of the IUGs 110A-N to the service adapter 120 via the service gateway 125 (at step 330). At step 335, the service adapter 120 requests for specific configuration data associated with the identified one of the IUGs 110A-N to the service gateway 125. For example, the configuration data includes configuration of the one of the IUGs 110A-N which differentiates the software application 115 from behaving from one IUG to other IUG.

At step 340, the service gateway 125 checks whether the requested configuration data is available. In one example embodiment, the service gateway 125 checks for cached configuration data stored in memory associated with the service gateway 125. If the requested configuration data is available in the memory of the service gateway 125, then the service gateway 125 retrieves the configuration data from the memory and forwards the configuration data to the service adapter 120 (step 365). If the requested configuration data is unavailable in the memory of the service gateway 125, the service gateway 125 requests the located one of the service modules 130A-N for the configuration data at step 345.

At step 350, the located one of the services modules 130A-N loads the requested configuration data from a storage device associated with the service server 310. At step 360, the appropriate one of the service modules 130A-N provides the loaded configuration data to the service gateway 125 such that the service gateway 125 caches the configuration data in the memory (step 360). Then, the service gateway 125 retrieves and sends the cached configuration data to the service adapter 120 as in step 365.

At step 370, the service adapter 120 forwards the process flow (e.g., processing logic) to the software application 115 on the application server 135 such that the software application 115 generates an appropriate response to provide access to the application functionality to the one of the IUGs 110A-N. In one example embodiment, the software application 115 generates the appropriate response based on the configuration data and the user request associated with the one of the IUGs 110A-N. At step 375, the service adapter 120 returns the generated appropriate response to the one of the IUGs 110A-N.

Accordingly, the appropriate response associated with the application functionality is displayed on a display of the user device 305 of the user associated with the one of the IUGs 110A-N such that the user is able to access the requested application functionality associated with the software application 115. In one embodiment, the webpage in hyper text markup language (HTML) is displayed on the display of the user device 305 which enables the user to access the application functionality associated with the software application 115.

FIG. 4 illustrates an exemplary implementation of the SEP system 100 in a virtual environment, according to one embodiment. As illustrated, the SEP system 100 includes an image of SEP 405 and an image of software applications 410. The image of SEP 405 may include the service gateway 125, the service modules 130A-N, an operating system (OS) instance 440, and an application container 445.

The service gateway 125 may be an open architecture which provides decoupled access to SEP services in a manner that the same set of SEP services can be used for software applications 115A-N built using different technologies. The service modules 130A-N may include an adaptation service module 415, an infrastructure service module 420, a business service module 425, a presentation service module 430, and a monitoring service module 435. In one example embodiment, each of the service modules 130A-N may provide a specific set of SEP services that are accessed through the service gateway 125 by the IUGs 110A-N.

The adaptation service module 415 may provide adapters to various legacy enterprise systems which the SEP system 100 can integrate with. The infrastructure service module 420 may provide a logging service, a security management service for authentication and authorization to the IUGs 110A-N, a user session management service for maintaining session data, a caching service, a reporting service, a business rule service, a software application deployment service, and a software application packaging and building service. The business service module 425 may provide a usage measurement service, a usage billing service, an IUG management service, a user management service, and an error handling service.

The presentation service module 430 may provide presentation services including a blog service, a wiki service, a calendaring service, a mashup service and so on. The monitoring service module 435 may provide operational services for software application monitoring and service monitoring using the Java Management Extensions (JMX) technology and an interface to the SEP administration console 470. For example, the services and software applications 115A-N can be monitored via the SEP administration console 470 using the JMX technology.

The image of software applications 410 includes an image of the software application 115A, an image of the software application 115B, an image of the software application 115C and so on. As illustrated, the image of the software application 115A includes the software application 115A, an application container 450A and an OS instance 455A. Similarly, the image of the software application 115B includes the software application 115B, an application container 450B and an OS instance 455B. Also, the image of the software application 115N includes the software application 115N, an application container 450N and an OS instance 455N. For example, an OS instance may be an instance of an operating system on which an application container executes. The application container includes a software application which when executed provides an appropriate access to application functionality to an IUG. Each of the software applications 115A-N is associated with the IUGs 110A-N. For example, as illustrated, the software application 115A is subscribed by the IUGs 110A-N.

The SEP system 100 also includes a utility cloud 460 in which the image of SEP 405 and the image of software applications 410 reside. In one example embodiment, the image of SEP 405 and the image of software applications 410 are deployed on the utility cloud 460 such that SEP services can be simultaneously consumed by the software applications 115A-N via the service gateway 125. The utility cloud 460 may be built using a hardware node instance cluster 465 which is made up of a group of hardware components (e.g., servers, computers, workstations, etc.). The utility cloud 460 includes the hardware node instance cluster 465 which may be virtualized using a hypervisor and controlled by cloud management software. The image of SEP 405 and the image of software applications 410 may be deployed on virtual machines created on the virtualized hardware layer via the cloud management software.

Further, the SEP system 100 includes the SEP administration console 470 for configuring configuration data associated with each IUG of the software applications 115A-N. As illustrated, the SEP administration console 470 provides IUG specific provisioning for software and OS of the software applications 115A-N. The SEP administration console 470 also enables configuration of the SEP based services such as IUG management, usage measurement, usage billing, security management and so on. Moreover, the SEP administration console 470 enables configuration of the utility cloud 460.

Figure 5:
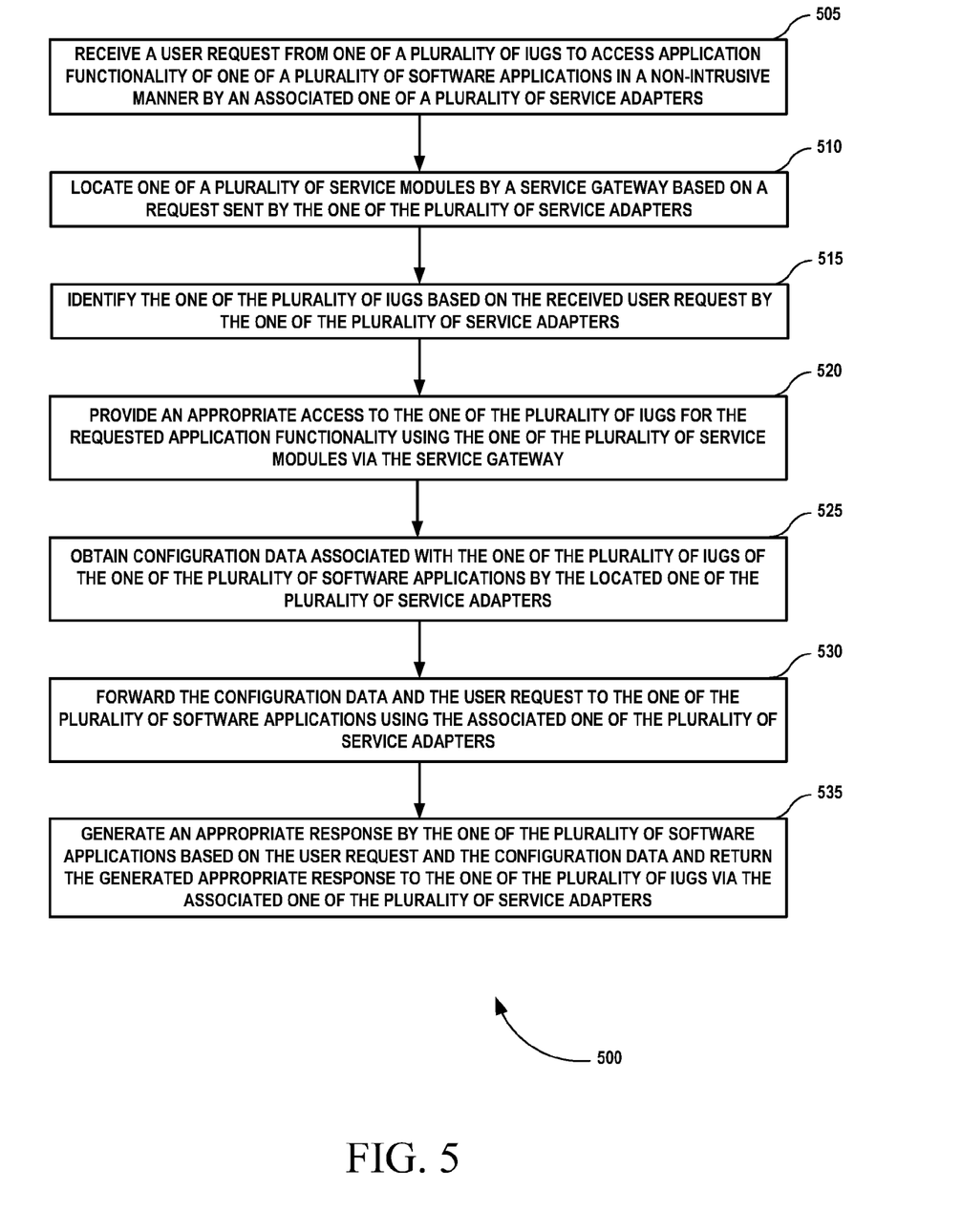
FIG. 5 is a process flowchart of an exemplary method of enabling a plurality of software applications as a service in a non-intrusive manner, according to one embodiment.

FIG. 5 is a process flowchart 500 of an exemplary method of enabling a plurality of software applications as a service in a non-intrusive manner, according to one embodiment. In operation 505, a user request is received from one of a plurality of IUGs to access application functionality of one of the plurality of software applications (e.g., the software applications 115A-N of FIG. 1) in the non-intrusive manner by an associated one of a plurality of service adapters (e.g., the service adapters 120A-N of FIG. 1). Upon receiving the user request, each service adapter is associated to one of the plurality of software applications for intercepting the user request by a configuration module (e.g., the configuration module 140 of FIG. 1). Then, said each service adapter is associated to the service gateway for attaching the one of the plurality of software applications to the service gateway by the configuration module.

In operation 510, one of a plurality of service modules (e.g., the service modules 130A-N of FIGS. 1 and 4) is located by a service gateway (e.g., the service gateway 125 of FIG. 1) based on a request sent by the one of the plurality of service adapters. For locating the one of the plurality of service modules each one of the plurality of service modules is configured to perform different service enablement features (e.g., IUG management, usage measurement, usage billing and so on) by the configuration module. Further, the service gateway is associated to the one of the plurality of service modules for fulfilling the different service enablement features by the configuration module.

In operation 515, the one of the plurality of IUGs is identified based on the received user request by the one of the plurality of service adapters. The one of the plurality of IUGs is identified by determining the one of the plurality of IUGs based on specific parameters in the received user request. In operation 520, an appropriate access is provided to the one of the plurality of IUGs for the requested application functionality using the one of the plurality of service modules via the service gateway. In one embodiment, the application functionality requested by the one of the plurality of IUGs is determined. Then, the requested application functionality is compared with an access control list configured for the one of the plurality of IUGs using the associated one of the plurality of service adapters. Based on the comparison, the one of the plurality of IUGs is authorized to access the requested application functionality.

In operation 525, configuration data associated with the one of the plurality of IUGs of the one of the plurality of software applications is obtained by the located one of the plurality of service adapters. The configuration data is obtained by initiating a request for specific configuration data of the one of the plurality IUGs to the service gateway by the associated one of the plurality of service adapters. In one embodiment, the requested configuration data is returned to the one of the plurality of service adapters when a cached copy of the configuration data is available. In another embodiment, the configuration data is loaded from a storage device associated with the one of the plurality of service modules when the cached copy of the requested configuration data is unavailable. Further, the loaded configuration data is cached and returned to the one of the plurality of service adapters.

In operation 530, the configuration data and the user request is forwarded to the one of the plurality of software applications using the associated one of the plurality of service adapters. In operation 535, an appropriate response to provide access to the application functionality is generated by the one of the plurality of software applications based on the user request and the configuration data. Further, in operation 535, the generated appropriate response is returned to the one of the plurality of IUGs via the associated one of the plurality of service adapters.

Figure 6:
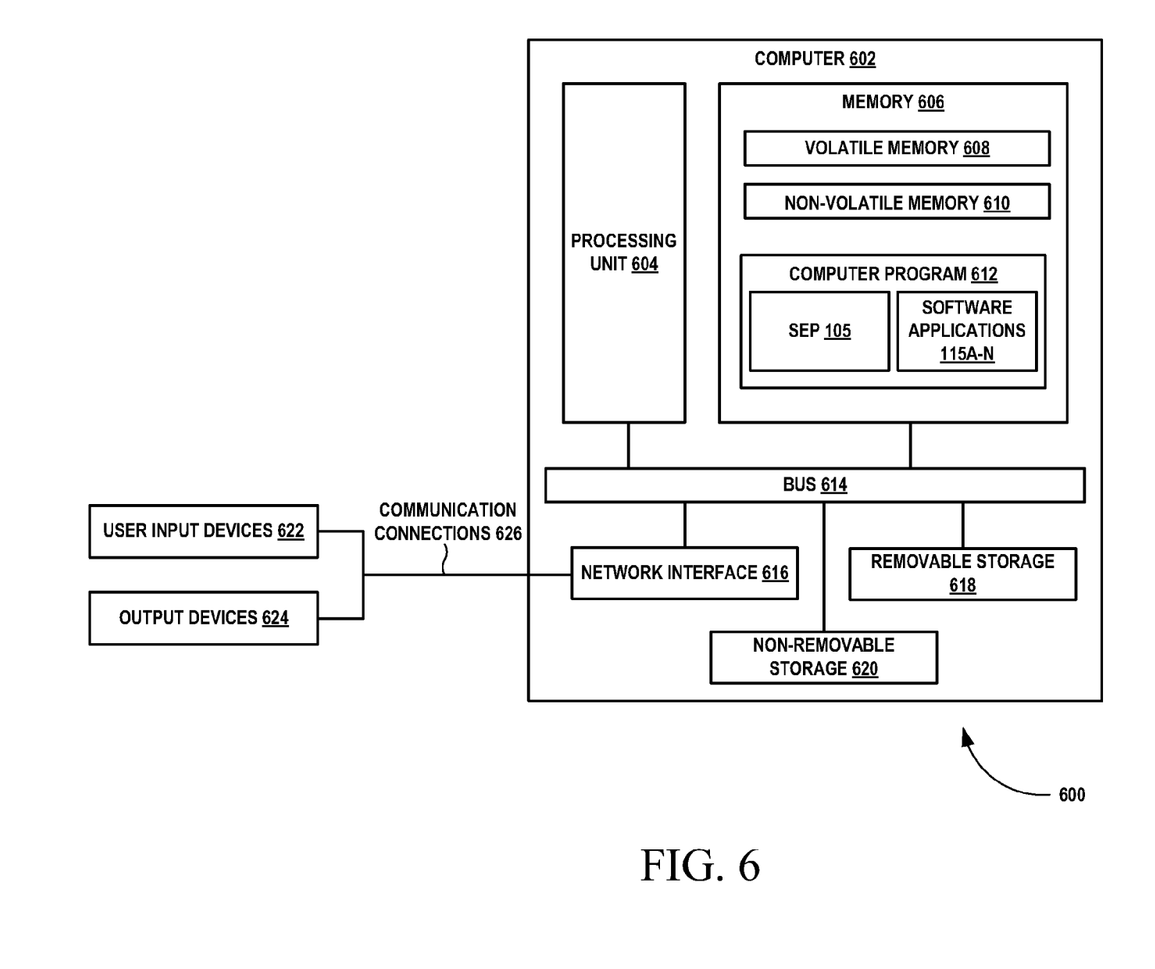
FIG. 6 shows an example of a suitable computing system environment for implementing embodiments of the present subject matter.

FIG. 6 shows an example of a suitable computing system environment 600 for implementing embodiments of the present subject matter. FIG. 6 and the following discussion are intended to provide a brief, general description of a suitable computing environment in which certain embodiments of the inventive concepts contained herein may be implemented.

A general computing device, in the form of a computer 602, may include a processing unit 604, a memory 606, a removable storage 622, and a non-removable storage 624. The computer 602 additionally includes a bus 618 and a network interface 620. The computer 602 may include or have access to a computing environment that includes one or more user input devices 626, one or more output devices 628, and one or more communication connections 630 such as a network interface card or a universal serial bus connection.

The one or more user input devices 626 may be a digitizer screen and a stylus and the like. The one or more output devices 628 may be a display device of computer, a computer monitor, and the like. The computer 602 may operate in a networked environment using the communication connection 630 to connect to one or more remote computers. A remote computer may include a personal computer, a server, a work station, a router, a network personal computer, a peer device or other network nodes, and/or the like. The communication connection 630 may include a local area network, a wide area network, and/or other networks.

The memory 606 may include volatile memory 608 and non-volatile memory 610. A variety of computer-readable media may be stored in and accessed from the memory elements of the computer 602, such as the volatile memory 608 and the non-volatile memory 610, the removable storage 622 and the non-volatile storage 624. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, MEMORY STICKS™, and the like.

The processing unit 604, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processing unit 604 may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media may be executable by the processing unit 604 of the computer 602. For example, a computer program 612 may include machine-readable instructions that are implemented in the SEP system 100 and capable of enabling the software applications 115A-N as a service in a non-intrusive manner according to the teachings and herein described embodiments of the present subject matter. In one embodiment, the computer program 612 may be included on a CD-ROM and loaded from the CD-ROM to a hard drive in the non-volatile memory 610. The machine-readable instructions may cause the computer 602 to encode according to the various embodiments of the present subject matter.

As shown, the computer program 612 includes the SEP 105 and the software applications 115A-N. The SEP 105 provides appropriate access to the application functionality of the software applications 115A-N to the IUGs 110A-N. The software applications 115A-N may be applications which are offered as a service to the IUGs 110A-N using the SEP 105.

For example, the computer-readable medium has instructions that, when executed by the computer 602, may cause the computer 602 to perform a method, implemented in the SEP system 100, in which a user request is received from one of the IUGs 110A-N to access application functionality of one of the software applications 115A-N in the non-intrusive manner by an associated one of the service adapters 120A-N. Then, one of the service modules 130A-N is located by the service gateway 125 based on a request by the associated one of the service adapters 120A-N. Further, the one of the IUGs 110A-N is identified by the associated one of the service adapters 120A-N based on the received user request. Furthermore, an appropriate access is provided to the one of the IUGs 110A-N for the requested application functionality via the service gateway 125 using the one of the service modules 130A-N.

Moreover, configuration data associated with the one of the IUGs 110A-N is obtained by the associated one of the service adapters 120A-N. Further, the configuration data and the user request is forwarded to the one of the software applications 115A-N using the associated one of the service adapters 120A-N. Accordingly, an appropriate response to provide access to the application functionality is generated by the one of the software applications 115A-N based on the user request and the configuration data. Finally, the generated appropriate response is returned to the one of the IUGs 110A-N via the associated one of the service adapters 120A-N. Moreover, the operation of the computer 602 for enabling the software applications 115A-N as a service in a non-intrusive manner is explained in greater detail with reference to FIGS. 1-6.

In one exemplary implementation, the AOP based enablement of the software applications 115A-N is described in below description for a job portal. Consider that, the job portal is a having company A and company B as IUGs. Also, consider that, the company A has URL as companyA.com for accessing the company A's webpage. Similarly, the company B has URL as companyB.com for accessing the company B's webpage. Further, configuration data (e.g., logo, job details, number of jobs, etc.) associated with each IUG to be presented in respective webpages is different.

Additionally, both the company A and company B has different set of users registered to access respective webpages. Suppose, if a user subscribing to the company A sends a HTTP request for the company A's webpage. In such a case, the aspect code in the service adapters 120A-N intercepts the HTTP request and requests the service gateway 125 to identify whether the request is for the company A's webpage or the company B's webpage based on the URL.

Further, upon the request from the aspect code executing on the application server 135, the configuration data associated with the company A is fetched from the memory of the service gateway 125 and then forwarded to the application server 135 hosting the job portal. Based on the configuration data associated with the company A, the application server 135 executes the job portal and generates the company A's webpage. For example, the aspects code in the associated one of the service adapters 120A-N induce the company A's specific behavior within the job portal using a cross-cutting technique based on the configuration data associated with the company A.

In this manner, the company A's webpage is presented to the user device 305 based on the HTTP request by running an instance of the job portal. Similarly, if another user subscribing to the company B requests for the company B's webpage, then the SEP system 100 may provide the company B's webpage to another user based on the configuration data associated with the company B. Thus, the SEP system 100 enables the job portal as a service in a non-intrusive manner by running the same instance of the job portal and using cross-cuts implemented by the AOP to inject the configuration data associated with the company B into the job portal.

In various embodiments, the methods and systems described from FIGS. 1 through 6 provides a stack of business services such as IUG management, usage measurement, usage billing, etc., in a service oriented architecture (SOA) based model used to operate a software application in a SEP system. The methods and systems allow a plurality of software applications to consume SEP services simultaneously via a service gateway in a decoupled manner such that the plurality of software applications are not dependent on programming language used by the SEP system.

The above-described technique provides non-intrusive enablement of software applications using aspect code such that the plurality of software applications, developed using different programming languages, are not modified for offering as a service. It can be noted that the software applications which are enabled can also operate in on-premise single-IUG mode as well.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present disclosure is not intended to be limited to the embodiments shown herein but is to be accorded the widest scope consistent with the principles and features disclosed herein.

What is claimed is:

1. A service enablement platform (SEP) system for enabling a plurality of software applications as a service in a non-intrusive manner in a plurality of isolated user groups (IUGs), wherein the IUGs are a group of users belonging to an organization that subscribes to the plurality of software applications, comprising:
    a plurality of service adapters, wherein an associated one of the plurality of service adapters intercepts a user request from one of the plurality of IUGs to access application functionality of one of the plurality of software applications in the non-intrusive manner, and wherein the associated one of the plurality of service adapters identifies the one of the plurality of IUGs based on the intercepted user request, wherein each of the plurality of service adapters comprises:
        a connector for attaching the one of the plurality of software applications associated with the associated one of the plurality of service adapters with a service gateway; and
        an interceptor for intercepting the user request received from the one of the plurality of IUGs to the one of the plurality of software applications associated with the associated one of the plurality of service adapters;
    a plurality of service modules;
    the service gateway, wherein the service gateway locates one of the plurality of service modules based on a request sent by the associated one of the plurality of service adapters, wherein the located one of the plurality of service modules provides appropriate access to the one of the plurality of IUGs for the requested application functionality via the service gateway, wherein the associated one of the plurality of service adapters obtains configuration data associated with the one of the plurality of IUGs, wherein the configuration data associated with each of the IUGs differentiates the plurality of software applications from behaving from one IUG to another IUG, wherein the associated one of the plurality of service adapters forwards the configuration data and the user request to the one of the plurality of software applications, and wherein the one of the plurality of software applications generates an appropriate response to provide access to the application functionality based on the user request and the configuration data and returns the generated appropriate response to the one of the plurality of IUGs via the associated one of the plurality of service adapters; and
    a configuration module, wherein the configuration module associates each of the plurality of service adapters to one of the plurality of software applications for intercepting the user request, wherein the configuration module further associates each of the plurality of service adapters to the service gateway for attaching the one of the plurality of software applications to the service gateway.

2. The system of claim 1, wherein enabling the plurality of software applications as a service comprises fulfilling service enablement features selected from the group consisting of IUG management, usage measurement, usage billing, security management, and user session management.

3. The system of claim 1,
    wherein the configuration module configures each of the plurality of service modules for performing different service enablement features, and wherein the configuration module furthermore associates the service gateway to the plurality of service modules for fulfilling the different service enablement features.

4. The system of claim 3, wherein each of the plurality of service adapters comprises:
    a session controller for controlling a plurality of IUG user sessions in collaboration with the service gateway; and
    a plurality of feature agents for invoking requests for the service enablement features on the service gateway corresponding to the user request.

5. The system of claim 4, wherein each of the plurality of service modules further comprises:
    a plurality of service handlers for fulfilling the service enablement features; and
    a service controller for managing the plurality of service handlers.

6. The system of claim 5, wherein the service gateway further comprises:
    a plurality of request handlers for invoking the plurality of service modules for servicing the request for the service enablement features from one of the plurality of service adapters; and
    a gateway controller for managing the plurality of request handlers and delegating a request for the service enablement features from the one of the plurality of service adapters to an associated one of the plurality of request handler.

7. The system of claim 6, wherein the user request intercepted by the associated one of the plurality of service adapters from the one of the plurality of IUGs is intercepted to identify the one of the plurality of IUG associated with the user request for the one of the plurality of software applications and to retrieve respective configuration data associated with the one of the plurality of IUGs and relevant to the user request via the service gateway.

8. A method for enabling a plurality of software applications as a service in a nonintrusive manner in a plurality of isolated user groups (IUGs), wherein the IUGs are a group of users belonging to an organization that subscribes to the plurality of software applications, comprising:

associating each of a plurality of service adapters to one of the plurality of software applications for intercepting a user request by a configuration module;

intercepting the user request received from one of the plurality of IUGs to access application functionality of one of the plurality of software applications in the non-intrusive manner by an associated one of the plurality of service adapters;

associating each of the plurality of service adapters to the service gateway for attaching the one of the plurality of software applications to the service gateway by the configuration module;

locating one of a plurality of service modules by a service gateway based on a request sent by the one of the plurality of service adapters;

identifying the one of the plurality of IUGs based on the intercepted user request by the located one of the plurality of service modules;

providing an appropriate access to the one of the plurality of IUGs for the requested application functionality using the one of the plurality of service modules via the service gateway;

obtaining configuration data associated with the one of the plurality of IUGs of the one of the plurality of software applications by the associated one of the plurality of service adapters, wherein the configuration data associated with each of the IUGs differentiates the plurality of software applications from behaving from one IUG to another IUG;

forwarding the configuration data and the user request to the one of the plurality of software applications using the associated one of the plurality of service adapters; and generating an appropriate response to provide access to the application functionality by the one of the plurality of software applications based on the user request and the configuration data and returning the generated appropriate response to the one of the plurality of IUGs via the associated one of the plurality of service adapters.

9. The method of claim 8, wherein identifying the one of the plurality of IUGs based on the intercepted user request by the one of the plurality of service adapters comprises determining the one of the plurality of IUGs based on specific parameters in the intercepted user request.

10. The method of claim 8, wherein providing the appropriate access to the one of the plurality of IUGs comprises:

determining the application functionality requested by the one of the plurality of IUGs;

comparing the requested application functionality with an access control list configured for the one of the plurality of IUGs using the associated one of the plurality of service adapters; and authorizing the one of the plurality of IUGs to access the requested application functionality.

11. The method of claim 8, wherein obtaining the configuration data associated with the one of the plurality of IUGs comprises:

initiating a request for specific configuration data of the one of the plurality IUGs to the service gateway by the associated one of the plurality of service adapters.

12. The method of claim 8, wherein obtaining the configuration data of the one of the plurality of IUGs further comprises:

returning the configuration data to the one of the plurality of service adapters when a cached copy of the configuration data is available.

13. The method of claim 8, wherein obtaining of the configuration data of the one of the plurality of IUGs further comprises loading the configuration data from a storage device associated with the one of the plurality of service modules when a cached copy of the requested configuration data is unavailable.

14. The method of claim 13, wherein the loaded configuration data is cached.

15. The method of claim 8, wherein locating the one of the plurality of service modules by the service gateway based on the request sent by the one of the plurality of service adapters comprises:

configuring each one of the plurality of service modules to perform different service enablement features by the configuration module; and associating the service gateway to the one of the plurality of service modules for fulfilling the different service enablement features by the configuration module.

16. A computer readable medium having instructions that, when executed by a computer, cause the computer to perform a method, implemented in the SEP system for enabling a plurality of software applications as a service in a non-intrusive manner in multiple isolated user groups (IUGs), wherein the IUGs are a group of users belonging to an organization that subscribes to the plurality of software applications, comprising:

associating each of a plurality of service adapters to one of the plurality of software applications for intercepting a user request by a configuration module;

intercepting the user request received from one of a plurality of IUGs to access application functionality of the one of the plurality of software applications in the non-intrusive manner by an associated one of the plurality of service adapters;

associating each of the plurality of service adapters to the service gateway for attaching the one of the plurality of software applications to the service gateway by the configuration module;

locating one of a plurality of service modules by a service gateway based on a request sent by the associated one of the plurality of service adapters;

identifying the one of the plurality of IUGs based on the intercepted user request by the located one of the plurality of service modules;

providing an appropriate access to the user for the requested application functionality using the located one of the plurality of service modules via the service gateway;

obtaining configuration data associated with the one of the plurality of IUGs of the one of the plurality of software applications by the associated one of the plurality of service adapters, wherein the configuration data associated with each of the IUGs differentiates the plurality of software applications from behaving from one IUG to another IUG; and forwarding the configuration data and the user request to the one of the plurality of software applications using the associated one of the plurality of service adapters; and generating an appropriate response to provide access to the application functionality by the one of the plurality of software applications based on the user request and the configuration data and returning the generated appropriate response to the one of the plurality of IUGs.

* * * * *